United States Patent [19]
Kawamura

[11] Patent Number: 5,469,514
[45] Date of Patent: Nov. 21, 1995

[54] OUTPUTTING APPARATUS

[75] Inventor: Yoshiaki Kawamura, Narashino, Japan

[73] Assignee: Canon Kabushiki Kaisha, Tokyo, Japan

[21] Appl. No.: 375,256

[22] Filed: Jan. 19, 1995

Related U.S. Application Data

[63] Continuation of Ser. No. 23,859, Feb. 24, 1993, abandoned, which is a continuation of Ser. No. 512,079, Apr. 12, 1990, abandoned, which is a continuation of Ser. No. 136,195, Dec. 21, 1987, abandoned.

[30] Foreign Application Priority Data

Jan. 12, 1987 [JP] Japan ......................... 62-5831

[51] Int. Cl.$^6$ ...................................... G06K 9/32
[52] U.S. Cl. ..................... 382/297; 382/290; 400/63; 400/323; 345/126; 395/110
[58] Field of Search .................. 382/46, 44, 41; 400/121; 395/110, 112, 117, 137; 345/126, 143

[56] References Cited

U.S. PATENT DOCUMENTS

| | | | |
|---|---|---|---|
| 4,000,486 | 12/1976 | Schomberg | 340/728 |
| 4,312,045 | 1/1982 | Jean et al. | 340/727 |
| 4,627,097 | 12/1986 | Finley et al. | 382/46 |
| 4,636,783 | 1/1987 | Omachi | 382/46 |
| 4,703,515 | 10/1987 | Baroody, Jr. | 382/46 |
| 4,716,544 | 12/1987 | Bartley | 382/46 |
| 4,763,281 | 8/1988 | Arakawa | 340/735 |
| 4,850,028 | 7/1989 | Kawamura et al. | 382/46 |
| 4,905,166 | 2/1990 | Schuerman | 382/55 |

FOREIGN PATENT DOCUMENTS 61-66658  5/1986  Japan .

*Primary Examiner*—Yon J. Couso
*Attorney, Agent, or Firm*—Fitzpatrick, Cella, Harper & Scinto

[57] ABSTRACT

An outputting apparatus having a mode which rotates a character pattern and outputs the rotated pattern. A predetermined pattern is stored in a memory in a rotated state. A rotated pattern is read out of the memory in accordance with a signal designating the output mode when it is stored in the memory, and output as it is.

24 Claims, 3 Drawing Sheets ad 2121P ad 2365P ad 2422P ad 3441P ad 2365R ad 2422R

OUTPUTTING APPARATUS

This application is a continuation of application Ser. No. 08/023,859, filed Feb. 24, 1993, now abandoned, which was a continuation of application Ser. No. 07/512,079, filed Apr. 12, 1990, now abandoned, which was a continuation of application Ser. No. 07/136,195, filed Dec. 21, 1987, now abandoned.

BACKGROUND OF THE INVENTION

1. Field of the Invention

This invention relates to an outputting apparatus which has, as a rotated pattern, letters, for example, of particular styles of type and numerals, having high frequency of use and which reduces the probability of the occurrence of overrun errors by reducing the number of pattern rotations during landscape printing.

2. Related Background Art

There are many kinds (7,000–8,000) of Chinese character patterns. It is a problem and almost impossible from a standpoint of memory capacity, cost, and mounting space to mount both of a set of portrait patterns (for a vertically long page)  which reads "kan" and represent "Chinese" and a set of landscape patterns (for a horizontally long page)  in accordance with an output form. As a result, a printer which has only a set of portrait patterns must rotate patterns when landscape printing is designated. This leads to a cause of overrun errors. While the marked example has been described using Chinese characters, problems are not limited to it. Similar problems are suspected to be lie in English characters, Chinese and Korean languages.

SUMMARY OF THE INVENTION

It is an object of this invention to provide an outputting apparatus having a rotated output mode which eliminates the above prior art drawbacks, reduces the probability of the occurrence of overrun errors without greatly increasing the size of a font memory, and improves the entire throughput.

It is another object of this invention to provide an outputting apparatus which adds a rotational font having a high frequency of use to a portrait font and expands the rotational font as needed to save the time required for rotational processing to thereby reduce the rate of occurrence of overruns and to improve the entire throughput.

DETAILED DESCRIPTION OF THE PREFERRED EMBODIMENTS

One embodiment of this invention will now be described.

This embodiment provides an outputting apparatus which adds a rotational font having a high frequency of use to a portrait font and expands the rotational font as needed to save the time required for the rotational processing to thereby reduce the rate of occurrence of overruns and to improve the entire throughput.

Figure 1A:
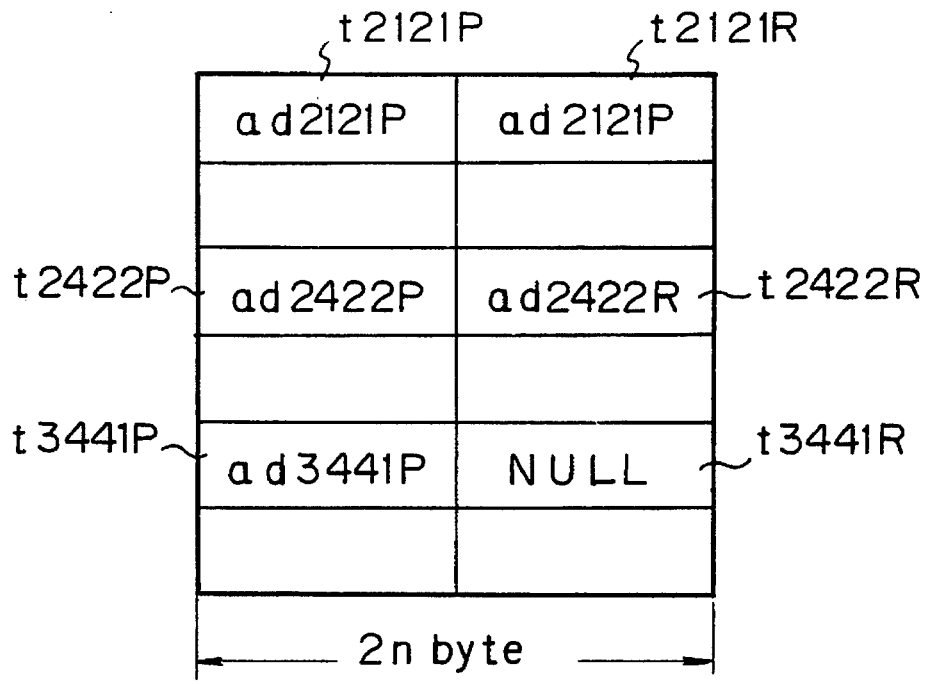
FIGS. 1(a)–1(b) illustrate the relationship between a character code pattern address conversion table and patterns.
Figure 1B:
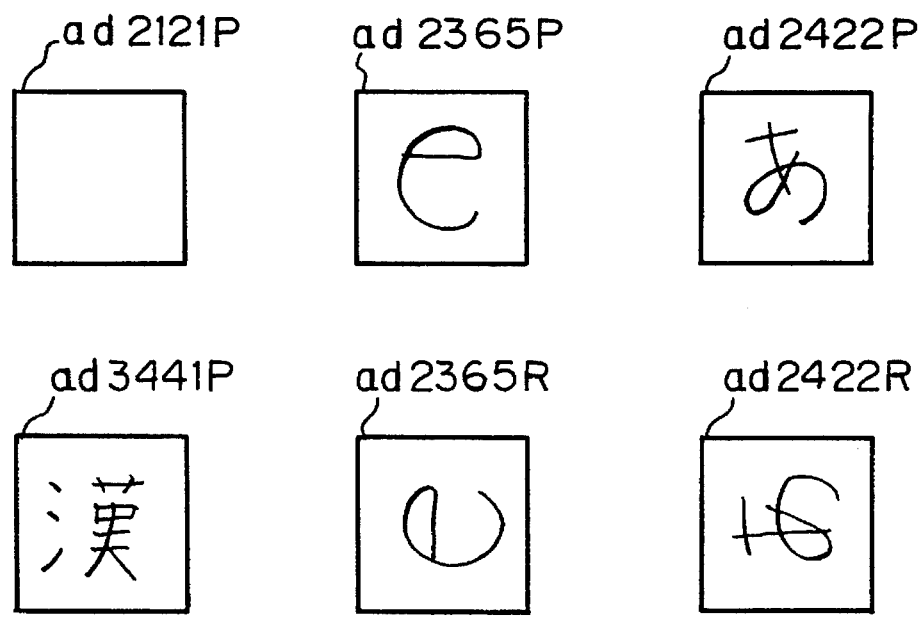
Figure 2:
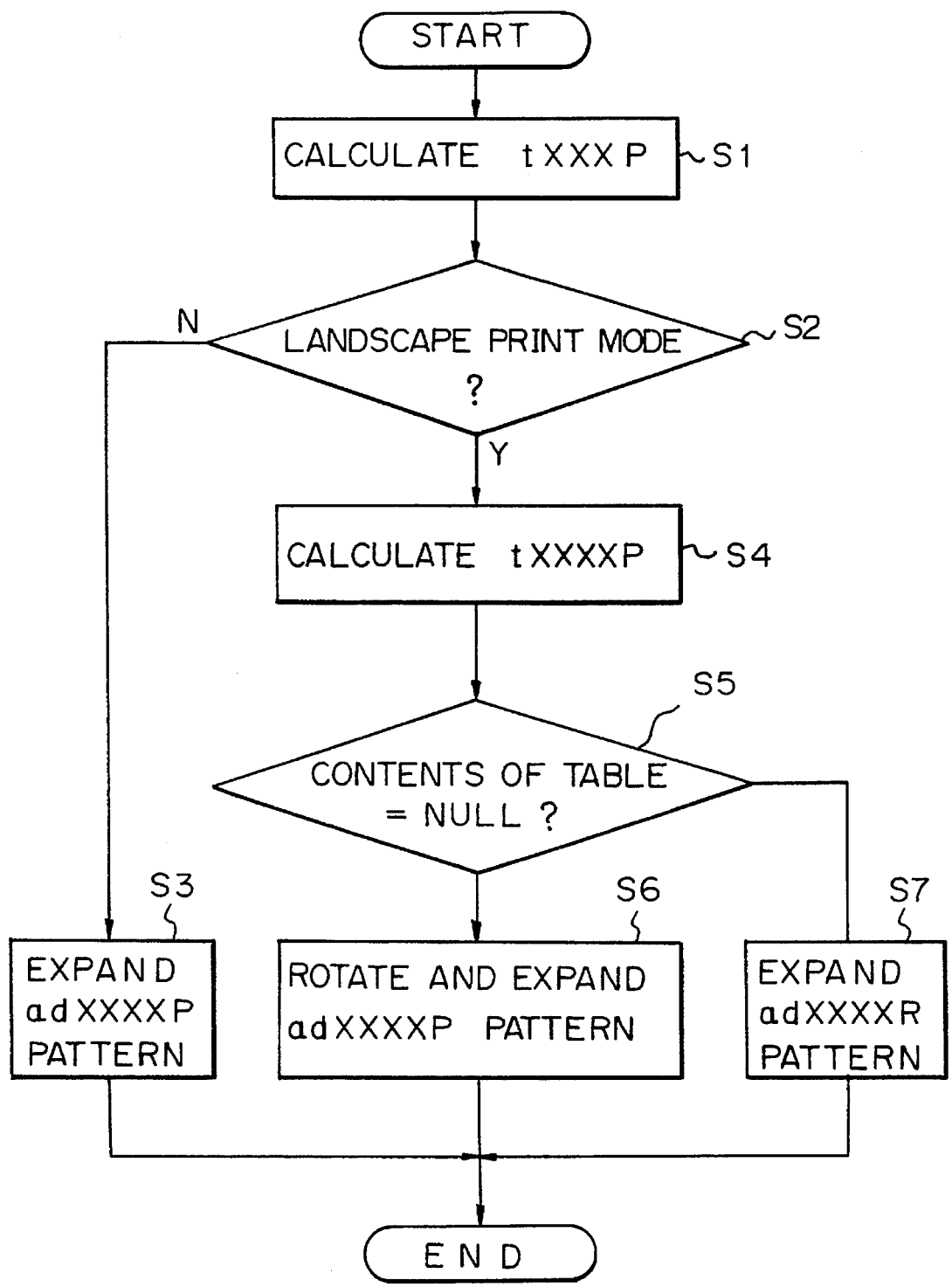
FIG. 2 is an output control flowchart for an embodiment of this invention.

Devices to which this invention may be applicable are, of course, a laser beam printer, a controller therefor, a ROM in which a program such as is shown in FIG. 2 for control of various units, etc. Also, of course, the devices include a paper cassette which is capable of placing many kinds of paper sheets (for portrait) thereon and a control panel having switches which switch between landscape and portrait output modes. In addition, of course, they include a ROM which stores the patterns and the conversion table shown in FIG. 1.

FIG. 1 shows a character code pattern address conversion table for accessing a pattern address corresponding to a character code. In this embodiment, a rotational font is arranged to be expanded by parts txxxxR, as needed. The use of the table will now be described. The cable address txxxxP is calculated from a character code (If the character code is $2121_H$, the table address is t2121P. Similarly, if the character code is $2424_H$, the table address is t2444P, and if the character code is $3441_H$, the cable address is t3441P.). Namely, portrait pattern addresses corresponding to the respective character codes are stored in n bytes of table addresses starting with txxxxP.

Landscape rotated pattern addresses are stored at positions of txxxxP+n bytes that is, =n bytes starting with txxxxR. It is to be noted that if the address is null, there is no rotated pattern. For example, the character code "あ" which reads "a" is $2422_H$, the table address where the portrait pattern is stored is t2422P and the landscape rotational pattern is stored at an address (t2422R) which starts from the $n^{th}$ byte position from that address. Similarly, if the character code "e" is, for example, $2365_H$, the table addresses become sequentially ad2365P and ad2365R (FIG. 1(b)).

This will now be described in more detail with reference to a flowchart shown in FIG. 2. At step 1, a character code to be output is received from a host and a conversion table address txxxxP is calculated from the character code. Of course, there are lines and interfaces which connect the host and the outputting apparatus. At step 2 the current printing mode is checked using a signal from a mode switch, etc., (not shown). If the mode is a portrait printing mode which does not require a rotated output, a shift is made to step 3 where the pattern shown by adxxxxP is expanded. If the mode is a landscape printing mode, a shift is made to step 4 where txxxxR is calculated from txxxxP+n. At step 5 it is determined whether there is a landscape rotated pattern. If not (adxxxxR=null), a shift is made to step 6 where the pattern shown by adxxxxP is rotated and expanded. If so, a shift is made to step 7 where the pattern shown by adxxxxR is expanded as it is without rotation.

While this invention has been described mainly with reference to a laser beam printer which may produce an overrun error, it may, of course, be applicable to other printers such as wire dot printers of the type which rotate the dot pattern for printing purposes. This invention is not limited to portrait and landscape printing applications.

As described above, according to this invention, several kinds of rotated patterns are added to portrait font patterns and printed as needed in order to prevent the occurrence of overrun errors and to improve the entire throughput.

As described above in detail, rotated fonts of "e" and Japanese Hiragana characters, "、", "。", etc., having a high frequency of use are stored in advance, so that even when rotation of a font is required in accordance with an output mode, the rotated font having high frequency of use can be used without being rotated. Therefore, the occurrence of an overrun error is prevented at a desired output mode and high-speed outputting is possible.

Figure 4:
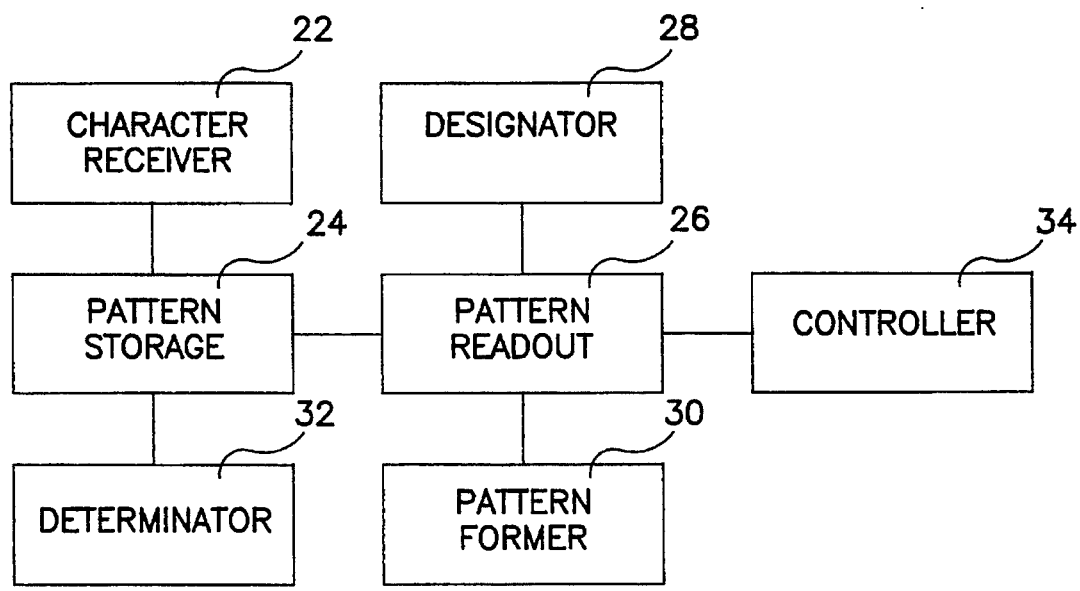
FIG. 4 is a schematic drawing illustrating an outputting apparatus according to another embodiment of the invention.

FIG. 4 is a schematic drawing illustrating an outputting apparatus according to another embodiment of the invention.

Figure 3:
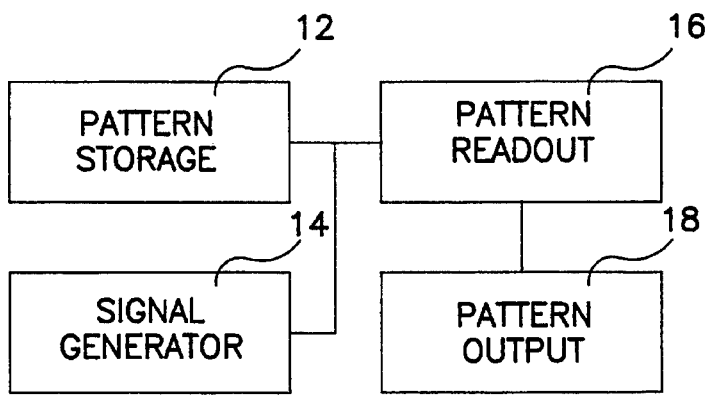
FIG. 3 is a schematic drawing illustrating an outputting apparatus according to one embodiment of the invention.

FIG. 3 illustrates an outputting apparatus according to one embodiment of the present invention. The outputting apparatus includes pattern storage 12, signal generator 14, pattern readout 16, and pattern output 18.

FIG. 4 illustrates another embodiment of the outputting apparatus including character receiver 22, pattern storage 24, pattern readout 26, designator 28, pattern former 30, determinator 32, and controller 34.

As described above, according to this invention, there is provided an outputting apparatus having a mode which rotates a character pattern and outputs the rotated pattern, comprising: means for storing a predetermined pattern as a rotated pattern; means for generating a signal designating an output mode; means for reading the predetermined pattern out of the storing means in accordance with the signal from the generating means; and means for outputting the pattern read by the reading means without rotating it.

What is claimed is:

1. A printer control apparatus comprising:

memory means for storing, for a character frequently used, font data disposed in a first direction and font data disposed in a second direction and storing, for a character less frequently used, font data disposed in the first direction;

a conversion table, provided for each of a plurality of character codes, for storing, at a first address corresponding to a character code, address information indicating a position in said memory means at which the font data in the first direction is stored and storing, at a second address remote from the first address by a prescribed distance common to every character code, address information indicating a position in said memory means at which the font data in the second direction is stored or identification information indicating that no font data in the second direction is stored for that character code;

means for deriving one of the first addresses of said conversion table corresponding to a character code for a character to be printed;

first determining means for determining whether a character should be printed in the first direction or in the second direction;

first generating means for generating a character pattern by reading the font data in the first direction stored in said memory means at the position indicated by the address information stored at the derived one first address of said conversion table, when said first determining means determines that the character should be printed in the first direction;

second determining means for determining whether information stored at one of the second addresses of said conversion table remote from the derived one first address by the prescribed distance is the address information or the identification information, when said first determining means determines that the character should be printed in the second direction; and second generating means for generating a character pattern by reading the font data in the second direction stored in said memory means at the position indicated by the address information stored at the one second address of said conversion table, when said second determining means determines that the information stored at the one second address of said conversion table is the address information, and for generating a character pattern by reading the font data in the first direction stored in said memory means at the position indicated by the address information stored at the derived one first address of said conversion table and by rotating the read font data, when said second determining means determines that the information stored at the one second address of said conversion table is the identification information.

2. An apparatus according to claim 1, further comprising a printer section for printing the character pattern generated by said first or second generating means.

3. An apparatus according to claim 1, wherein the font data in the first direction stored in said memory means comprises font data for portrait printing and the font data in the second direction stored in said memory means comprises font data for landscape printing.

4. An apparatus according to claim 2, wherein the font data in the first direction stored in said memory means comprises font data for portrait printing and the font data in the second direction stored in said memory means comprises font data for landscape printing.

5. An apparatus according to claim 1, further comprising instruction means for giving an instruction for determining whether the character should be printed in the first direction or in the second direction, wherein said first determining means makes a determination in response to the instruction given by said instruction means.

6. An apparatus according to claim 2, further comprising instruction means for giving an instruction for determining whether the character should be printed in the first direction or in the second direction, wherein said first determining means makes a determination in response to the instruction given by said instruction means.

7. An apparatus according to claim 3, further comprising instruction means for giving an instruction for determining whether the character should be printed in the first direction or in the second direction, wherein said first determining means makes a determination in response to the instruction given by said instruction means.

8. An apparatus according to claim 4, further comprising instruction means for giving an instruction for determining whether the character should be printed in the first direction or in the second direction, wherein said first determining means makes a determination in response to the instruction given by said instruction means.

9. An apparatus according to claim 5, wherein said instruction means comprises a switch provided on an operation panel of said apparatus.

10. An apparatus according to claim 6, wherein said instruction means comprises a switch provided on an operation panel of said apparatus.

11. An apparatus according to claim 7, wherein said instruction means comprises a switch provided on an operation panel of said apparatus.

12. An apparatus according to claim 8, wherein said instruction means comprises a switch provided on an operation panel of said apparatus.

13. A method for operating a printer control apparatus having memory means for storing, for a character frequently used, font data disposed in a first direction and font data disposed in a second direction and storing, for a character less frequently used, font data disposed in the first direction, and having a conversion table, provided for each of a plurality of character codes, for storing, at a first address corresponding to a character code, address information indicating a position to a character code, address information indicating a position in the memory means at which the font data in the first direction is stored and storing, at a second address remove from the first address by a prescribed distance common to every character code, address information indicating a position in the memory means at which the font data in the second direction is stored or identification information indicating that no font data in the second direction is stored for that character code; said method comprising:

- a deriving step, for deriving one of the first addresses of the conversion table corresponding to a character code for a character to be printed;
- a first determining step, for determining whether a character should be printed in the first direction or in the second direction;
- a first generating step, for generating a character pattern by reading the font data in the first direction stored in the memory means at the position indicated by the address information stored at the derived one first address of the conversion table when it is determined in said first determining step that the character should be printed in the first direction;
- a second determining step, for determining whether information stored at one of the second addresses of the conversion table remote from the derived one first address by the prescribed distance in the address information or the identification information, when it is determined in said first determining step that the character should be printed in the second direction; and
- a second generating step, for generating a character pattern by reading the font data in the second direction stored in the memory means at the position indicated by the address information stored at the one second address of the conversion table when it is determined in said second determining step that the information stored at the one second address of the conversion table is the address information and for generating a character pattern by reading the font data in the first direction stored in the memory means at the position indicated by the address information stored at the derived one first address of the conversion table, and by rotating the read font data when it is determined in said second determining step that the information stored at the one second address of the conversion table is the identification information.

14. A method according to claim 13, further comprising the step of using a printer section for printing the character pattern generated in said first or second generating step.

15. A method according to claim 13, wherein the font data in the first direction stored in the memory means comprises font data for portrait printing and the font data in the second direction stored in the memory means comprises font data for landscape printing.

16. A method according to claim 14, wherein the font data in the first direction stored in the memory means comprises font data for portrait printing and the font data in the second direction stored in the memory means comprises font data for landscape printing.

17. A method according to claim 13, further comprising the step of giving an instruction for determining whether the character should be printed in the first direction or in the second direction, wherein, in said first determining step, a determination is made in response to the instruction given in said instruction step.

18. A method according to claim 14, further comprising the step of giving an instruction for determining whether the character should be printed in the first direction or in the second direction, wherein, in said first determining step, a determination is made in response to the instruction given in said instruction step.

19. A method according to claim 15, further comprising the step of giving an instruction for determining whether the character should be printed in the first direction or in the second direction, wherein, in said first determining step, a determination is made in response to the instruction given in said instruction step.

20. A method according to claim 16, further comprising the step of giving an instruction for determining whether the character should be printed in the first direction or in the second direction, wherein, in said first determining step, a determination is made in response to the instruction given in said instruction step.

21. A method according to claim 17, wherein said instructing step is performed using a switch provided on an operation panel of the apparatus.

22. A method according to claim 18, wherein said instructing step is performed using a switch provided on an operation panel of the apparatus.

23. A method according to claim 19, wherein said instructing step is performed using a switch provided on an operation panel of the apparatus.

24. A method according to claim 20, wherein said instructing step is performed using a switch provided on an operation panel of the apparatus.

* * * * *

UNITED STATES PATENT AND TRADEMARK OFFICE
CERTIFICATE OF CORRECTION

PATENT NO. : 5,469,514

DATED : November 21, 1995

INVENTOR(S): YOSHIAKI KAWAMURA

It is certified that error appears in the above-identified patent and that said Letters Patent is hereby corrected as shown below:

SHEET 2 OF 3

FIG. 2, "tXXXP" should read --tXXXXP--.

COLUMN 1

Line 24, "represent" should read --represents--.
    Line 32, "be lie" should read --be likely--.

COLUMN 2

Line 9, "placing" should read --receiving--.
    Line 19, "cable" should read --table--.
    Line 21, "t2444P," should read --t2424P,--.
    Line 22, "cable" should read --table--.
    Line 27, "bytes that" should read --bytes, that-- and "=n" should read --in n--.
    Line 39, "step 1," should read --step S1,--.
    Line 43, "step 2" should read --step S2--.
    Line 44, "etc.," should read --etc.--.
    Line 46, "step 3" should read --step S3--.
    Line 49, "4" should read --S4-- and "step 5" should read --step S5--.
    Line 51, "step 6" should read --step S6--.
    Line 53, "step 7" should read --step S7--.

UNITED STATES PATENT AND TRADEMARK OFFICE
CERTIFICATE OF CORRECTION

PATENT NO. : 5,469,514

DATED : November 21, 1995

INVENTOR(S) : YOSHIAKI KAWAMURA

It is certified that error appears in the above-identified patent and that said Letters Patent is hereby corrected as shown below:

COLUMN 3

Lines 7-9 should be deleted.

COLUMN 5

Line 10, "remove" should read --remote--.

Signed and Sealed this

Twenty-third Day of April, 1996

Attest:

BRUCE LEHMAN

Attesting Officer　　　Commissioner of Patents and Trademarks